United States Patent Office 3,300,449
Patented Jan. 24, 1967

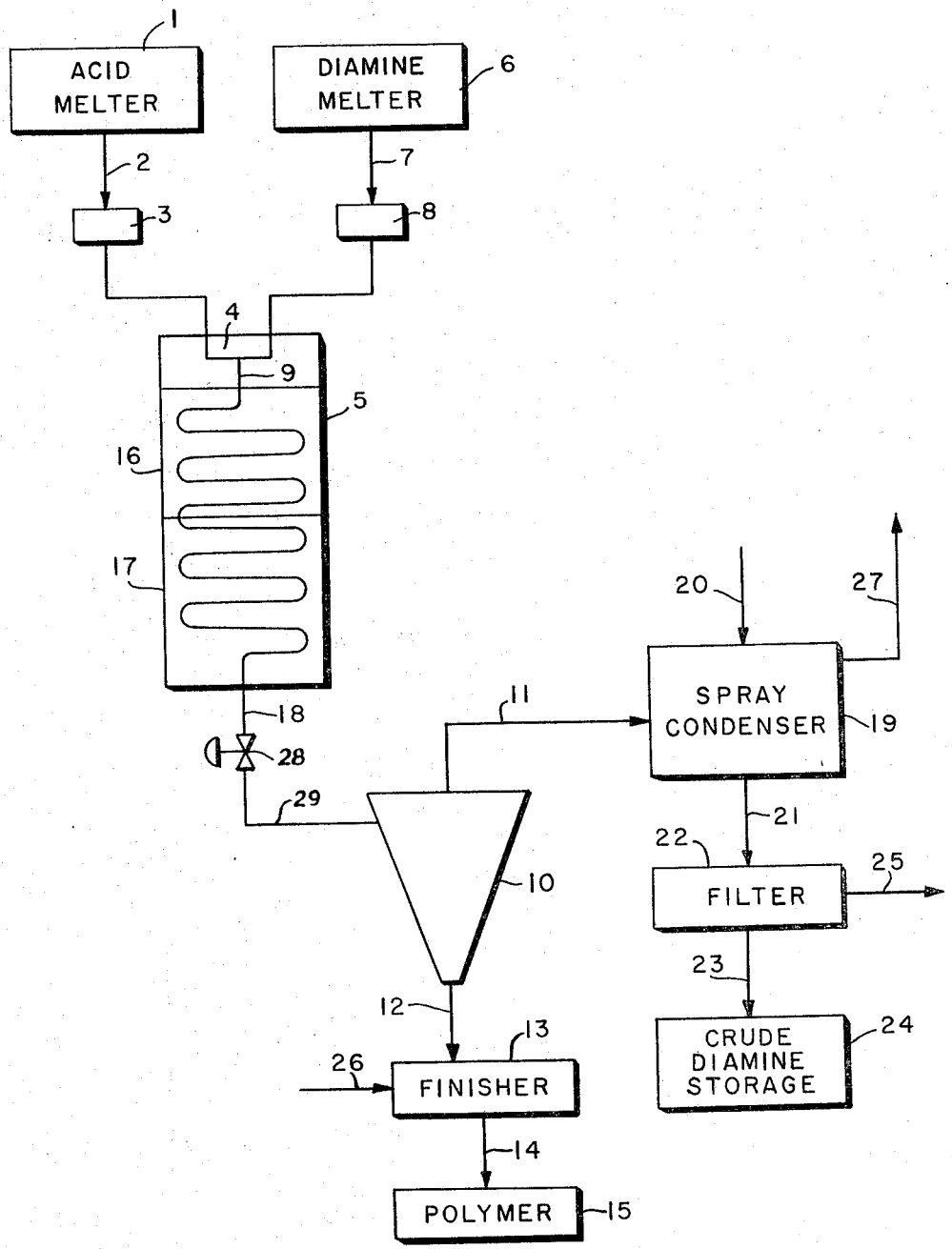

3,300,449
PROCESS FOR PRODUCTION OF
POLYCARBONAMIDES
Edmond P. Brignac, Pensacola, Fla., assignor to Monsanto Company, St. Louis, Mo., a corporation of Delaware
Continuation of application Ser. No. 228,496, Oct. 4, 1962. This application Oct. 19, 1964, Ser. No. 406,216
1 Claim. (Cl. 260—78)

This is a continuation of application Serial No. 228,496, filed October 4, 1962, now abandoned.

This invention relates to an apparatus and an improved process for the production of high molecular weight polymers, especially those prepared by condensation-type reactions, such as polyamides, polyesters, and the like. More particularly, this invention relates to an apparatus and an improved process for the continuous production of linear polycarbonamides of a type characterized by high molecular weight including those particularly useful in the formation of shaped articles such as fibers, filaments, and the like.

The production of the linear condensation polymers from polymer forming reactants has assumed increasing commercial importance throughout various industries. It is because of the increasing commercial importance that new apparatus and improved processes which give improved quality products in a more economical manner are necessary.

In the formation of such linear polymers, particularly those of the type having properties which include film and fiber forming properties, the polymeric end product may be a polycarbonamide which is formed from liquid compositions comprising polycarbonamide forming reactants. In one example of the formation of polycarbonamides, such as nylons and the like, a solution of polycarbonamide forming composition which usually contains water or other solvent is subjected to superatmospheric pressures and polycarbonamide forming temperatures to carry out the polycondensation or polycarbonamide forming reaction. As the polycondensation of the polycarbonamide forming composition progresses, the viscosity of the polycarbonamide reaction mass increases in a well-known manner until the desired degree of polymerization is obtained.

Previous polycarbonamide forming compositions comprise water solutions of hexamethylenediamine and adipic acid, and the preparation of these solutions commercially entails great amounts of time and handling. In order to insure filaments or fibers of high quality and excellent properties, it has been thought in the past that considerable blending of the manufactured hexamethylenediamine, as well as blending of the manufactured adipic acid, was necessary to obtain both hexamethylenediamine and adipic acid of uniform quality and high purity.

Further, after blending of the hexamethylenediamine and adipic acid, these reactants are mixed and diluted with water to a 40 to 60 percent concentration so that the reactant solution can be stored for periods without precipitation or other loss of the polycarbonamide forming reactants. To insure further the uniform quality of product, these water solutions of the reactants or nylon salt solutions are blended with other similar nylon salt solutions.

Additional treating operations are also carried out for other purposes. The nylon salt solution is treated with activated carbon so that the resultant polymer will have good clarity or whiteness, and the pH of the solution is adjusted prior to the beginning of the commercial polymerization operation so that the resultant polymer will have uniform dye receptivity and a uniform variation of polymer molecular weight.

Even though all the above mentioned pretreatment operations appear to be traditional in the manufacture of high molecular weight polycarbonamides such as nylon, it has not been shown that these treatments are necessary or even advisable for nylon polymer which is to be used in certain specific applications where tensile strength, elasticity, and other similar physical properties are of prime importance. An example of such an application in the use of nylon as a reinforcing matrix in the manufacture of automobile and truck tires.

Further, in the first steps of the formation of polycarbonamides such as nylon, previous processes require the heating of the nylon salt solution at superatmospheric pressures to remove the water solvent, and since the polymerization of the reactants is one of condensation wherein water is released as the polymer is formed, the removal of the water of solution as well as the water of formation from the polymer without thermal degradation of the polymer during such removal is one of the critical problems of all previous commercial polycarbonamide forming processes.

Previously, all efforts to mix polycarbonamide reactants such as adipic acid and hexamethylenediamine in the absence of a suitable solvent have been unsuccessful because of the strong propensity of these reactants to form agglomerate masses which cannot be melted for reactant purposes due to the low heat transfer coefficient and smooth surface of the agglomerate mass. These agglomerate masses which remain unmelted create a non-homogeneous reactant system which prevents polymerization and causes excessive pressure drop and unnecessary shutdowns in commercial continuous polymerization apparatus.

It is, therefore, a first object of this invention to provide a new and novel apparatus and an improved process for the manufacture of polycarbonamides in the absence of solvent for the polycarbonamide reactants.

Another object of this invention is to provide a new apparatus and process for the manufacture of polycarbonamides which is more economical than previously known processes.

Still another object of this invention is to provide an apparatus and process for manufacture of polycarbonamides which will reduce or eliminate thermal degradation of the polymer during its formation.

A further object of this invention is to provide a new and novel apparatus and process for the manufacture of polycarbonamides in a shorter period of time than was previously possible.

Other objects and advantages of this invention will become apparent from the following description thereof considered in connection with the drawing.

The objects of this invention are accomplished by providing simultaneously, under proper rheological and pressure conditions, controlled volumes of refined hexamethylenediamine and molten adipic acid to a high temperature, high surface area to volume ratio reaction zone; causing the reactants to be retained in the reaction zone for a short period of time; removing the reactants from the reaction zone to a subsequent reduced pressure zone where vapor is permitted to separate from the polymer forming reactants; and then causing the reactants to be finished or polymerized to the desired degree of polymerization in a standard nylon screw finisher or other similar finishing apparatus suitable for the purpose. The vapors which are formed in the reduced pressure zone are subjected to appropriate means, such as spray condensing and filtering to recover hexamethylenediamine vaporized in this step, and the recovered hexamethylenediamine is recycled, after necessary purification by refining or other means, to the beginning of the process.

The novel features which are believed to be characteristic of this invention are set forth with particularity in the appended claim, however, the invention itself, both as to its organization and its method of operation, may be understood best by reference to the following description taken in conjunction with the accompanying drawing in which:

FIGURE 1 is a flow sheet or diagram illustrating a polymerization process carried out in accordance with the invention.

Although, in general, any suitable polymer forming composition may be processed with the novel apparatus and improved process of this invention, those materials capable of undergoing polycondensation and capable of producing high molecular weight compounds, e.g., those having fiber forming characteristics, are preferable. It is with reference thereto that the novel method of the invention will be described.

Polymer forming compositions suitable for preparing fiber forming polymers may be of any type from which polycarbonamides are prepared and it is for the preparation of polycarbonamides, which includes the commercially produced nylons, that the description of the invention will be directed specifically hereinafter.

Referring now to FIGURE 1, there is shown schematically one embodiment of the novel process for making linear polymers contemplated by this invention. In this embodiment, high purity molten adipic acid from adipic acid melter 1, is fed by line 2, to pump 3 where it is pumped under pressure to injection loop 4 within reaction zone 5. The molten adipic acid under high pressure is joined at injection loop 4 by controlled volumes of refined hexamethylenediamine under equal pressure which has been fed from hexamethylenediamine melter 6 by line 7 to pump 8.

In a typical example the molten adipic acid and refined hexamethylenediamine melters may be steam jacketed vessels containing a means for agitating or stirring the contents thereof. The temperature of the adipic acid within the adipic acid melter may be between 160° C. and 200° C. and the temperature of the hexamethylenediamine may be between 20° C. and 50° C. Inert gas pressure may be applied to the contents of either vessel if desired.

Pumps 3 and 8 may be of any type suitable for handling hot liquids and capable of delivering controlled volumes of the hot liquid at pressures up to 2500 pounds per square inch. A typical example of a suitable pump is a "Zenith" type gear pump provided with steam tracer lines around the pump body. Steam tracer lines may be provided around all lines leading from the melters to the pumps and from the pumps to the reaction zone if needed to maintain the adipic acid and the hexamethylenediamine in the desired temperature ranges.

Because of the well-known action and reaction of the molten adipic acid and the refined hexamethylenediamine when these compounds are brought together or mixed in high concentrations, the injection loop 4 provides a means for mixing substantially pure molten adipic acid and refined hexamethylenediamine in the absence of a solvent such as water so that a homogeneous mixture free from agglomerate lumps is obtained.

The injection loop 4 may comprise any means suitable for bringing the reactant liquids together at high velocities under turbulent flow conditions at a Reynolds number of 5000 or greater immediately upon their joining and may be a restricting device such as a venturi section in the piping, a restricting orifice, or any suitable means. Reynolds number, as is well known in the art, is that dimensionless quantity used as an expression of fluid flow and is defined specifically in Chemical Engineers' Handbook, Third Edition, as edited by John H. Perry, according to the equation: $N_{Re} = DV_\rho/\mu$, wherein D is the pipe diameter, wherein V is the linear velocity of the fluid moving therethrough, wherein $\rho$ is the density of the fluid, and wherein $\mu$ is the absolute viscosity of the fluid. This equation defines fluid flow in full circular pipes. Modifications of the equation for different shaped conduits are obvious to the art, and are set forth in Perry above.

The turbulently mixed hot reactant liquids proceed under pressure as shown by line 9 to reaction zone 5 which consists of a preheating section 16 and a pressure reduction section 17. The reaction zone 5 may be any device designed to have a high surface to volume ratio for the reacting liquids, have good heat transfer properties, and be able to withstand high pressures. A device which may be suitable is a tube bundle heat exchanger with the reactant liquids passing inside the tubes and heat transfer media such as high pressure steam or Dowtherm in the area surrounding the tubes.

In a typical example the reaction liquids within the injection loop and preheating section of the reaction zone may be mixed in substantially equal volumes and are under pressures of from 1000 p.s.i.g. to 2500 p.s.i.g. at temperatures from 250° C. to 400° C. For operation on a continuous basis, the reaction zone consisting of the preheating section and the pressure reduction section should be designed so that the reacting liquids have a retention time therein of 10 minutes to 120 minutes.

The reacting liquids and partially reacted polymer which has been formed in the reaction zone exit the reaction zone as shown by line 18 and pass through pressure control means 28. Pressure control means 28 may be any device suitable for controlling the reactant liquid pressures within the pressure reduction zone 17 at pressures between 0 p.s.i.g. and 25 p.s.i.g. and may be any manual or automatic pressure control valve which is well known in industry.

The material of line 29 leaving pressure control valve 28 comprises unreacted liquid adipic acid and hexamethylenediamine; partially polymerized hexamethylene ammonium adipate; water of reaction formed from the condensation polymerization of the reactants, both in the liquid and vapor phase; and hexamethylenediamine vapor. This mixture proceeds by line 29 to vapor separator 10 wherein the primary separation of the liquid components of the mixture takes place.

In a typical example, vapor separator 10 may be a cylindrical or a truncated conical vessel wherein the mixture from line 29 is introduced substantially tangential to the circular cross section of the vessel and swirls around the sides of the vessel falling toward the collection head or truncated section to exit for further polymerization, and the vapor rises from the center of the vessel to be drawn off at the top thereof. Suitable means may be provided for supplying heat to the vapor separator if desired.

Liquid polymeric material capable of undergoing further polymerization exits from the vapor separator 10 as shown by line 12 to finisher 13 wherein the final step of the polymerization process takes place. Finisher 13 may be of any design suitable for providing good heat transfer and mixing conditions to the polymer supplied thereto and many designs are well known in the art.

In a typical example, finisher 13 may be a horizontal screw finisher operated at atmospheric, less than atmospheric, or greater than atmospheric pressure with the temperature of the reaction mass therein maintained between 260° C. and 300° C. depending upon the polymer properties which are desired. The dwell time of the polymer within the finisher may be from 10 minutes to 3 hours.

Polymer with the desired properties exits from the finisher as shown by line 14 to block 15 which may comprise any subsequent polymer forming or storing procedure such as the spinning of fibers or the banding of the polymer with subsequent chipping for storage or blending for subsequent use.

The disengaged vapors exiting from the top of vapor separator 10 as shown by line 11 proceed to spray condenser 19 wherein the unreacted hexamethylenediamine vapors and entrained partially polymerized material are condensed. Cooling water enters spray condenser 19 by line 20 and condenses water and hexamethylenediamine vapor and partially polymerized material which proceed from the spray condenser as shown by line 21 to filter 22 where the water and hexamethylenediamine are separated from the partially polymerized material with the condensed hexamethylenediamine and water proceeding by line 23 to crude diamine storage 24 and the partially polymerized material being sent to waste or other disposal by line 25. The crude diamine may be returned to standard refining processes and fed as desired to the diamine melter 6 for reuse in the process.

If desired, gas inert to the system may be fed countercurrent to the flow of the polymer in the process to aid in the removal of water vapor and the control of the degree of polymerization of the polymer. If this is done, gas inert to the system enters the process as shown by line 26, proceeds countercurrent to the flow of the polymer of line 12, exits from the vapor separator 10 by line 11, is not condensed in the spray condenser 19, and exits from the system by line 27 to an inert gas recovery system for reuse or is discharged to waste.

As can be seen clearly from the above description, the process of this invention eliminates completely the need for adding and removing large quantities of water. This makes possible heretofore unheard of savings in heat energy which must be supplied to the process and permits the formation of polymer with desired properties in extremely short periods of time and a most economical manner.

As many apparently widely different embodiments of this invention may be made without departing from the spirit and scope thereof, it must be understood that I do not limit myself to the specific embodiments thereof except as defined in the appended claim.

What is claimed is:

A continuous substantially solventless process for the manufacture of linear polycarbonamides characterized by high molecular weight from hexamethylenediamine and adipic acid which comprises the steps of:

(a) melting separating substantially pure adipic acid at a temperature of 160° C. to 180° C. and substantially atmospheric pressure;

(b) melting separately refined hexamethylenediamine at a temperature of 20° C. to 50° C. and substantially atmospheric pressure;

(c) combining continuously at a temperature of 250° C. to 400° C. and a pressure of 1000 p.s.i to 2500 p.s.i substantially equal quantities of melted said adipic acid and melted said hexamethylenediamine under the rheological condition of turbulence defined by a Reynolds number of at least 5000;

(d) permitting combined said melted adipic acid and said melted hexamethylenediamine to movingly reside in a preheating and reaction zone at a temperature of 250° C. to 400° C. and a pressure of 1000 pounds per square inch to 2500 pounds per square inch for a period of 10 minutes to 120 minutes;

(e) continuously subjecting material exiting the preheating and reaction zones to a pressure reduction zone operated at a pressure of atmospheric to 25 pounds per square inch, and thereafter;

(f) continuously polymerizing in a finisher the liquid material exiting the pressure reduction zone at a temperature of 260° C. to 300° C. and substantially atmospheric pressure for a period of ten minutes to three hours.

References Cited by the Examiner

UNITED STATES PATENTS 2,361,717 10/1944 Taylor _____ 260—78
2,689,839 9/1954 Heckert _____ 260—78
2,840,547 6/1958 Stump _____ 260—78

WILLIAM H. SHORT, *Primary Examiner.*

H. D. ANDERSON, *Assistant Examiner.*